No. 779,508. PATENTED JAN. 10, 1905.
D. M. THERRELL.
ART OF ELECTRICAL WAVE TRANSMISSION.
APPLICATION FILED FEB. 17, 1902.
4 SHEETS—SHEET 1.
Fig. 1.
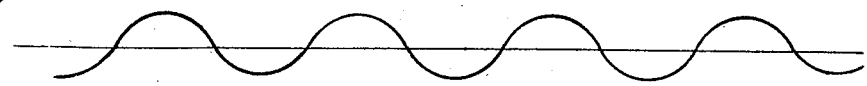
Fig. 2.
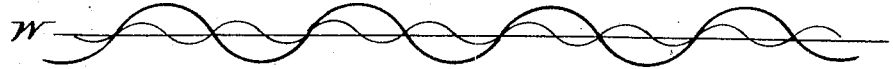
Fig. 3.
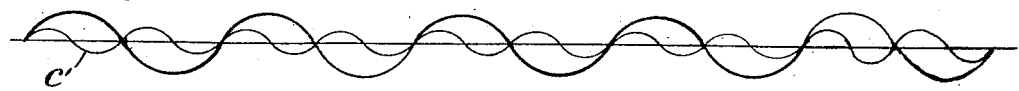
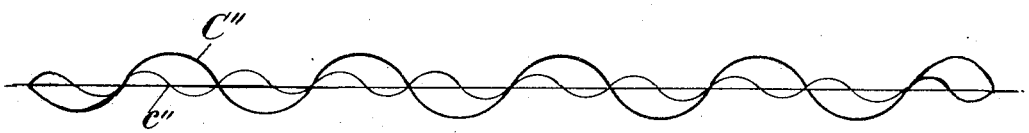
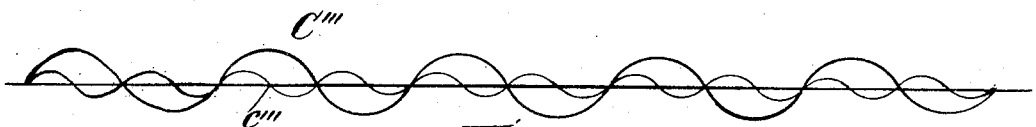
Fig. 4.
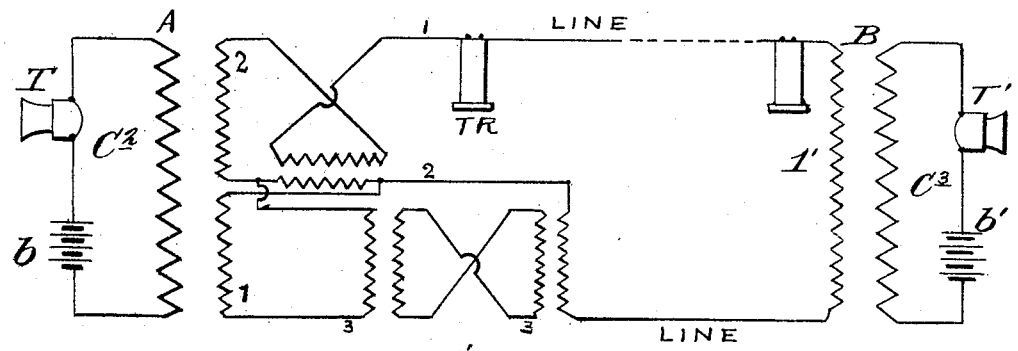
Fig. 10.
Witnesses
Franck L. Ourand
Wm W. Grebe
Inventor
D. MacLauchlin Therrell No. 779,508. PATENTED JAN. 10, 1905.
D. M. THERRELL.
ART OF ELECTRICAL WAVE TRANSMISSION.
APPLICATION FILED FEB. 17, 1902.
4 SHEETS—SHEET 2.
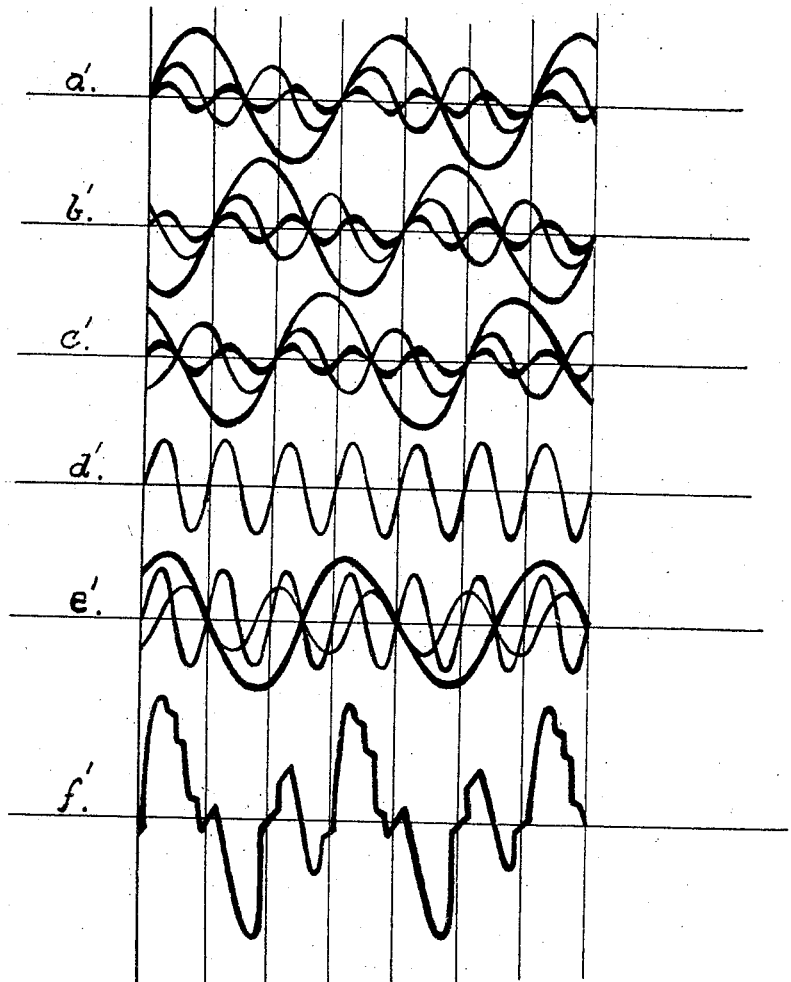

No. 779,508. PATENTED JAN. 10, 1905.
D. M. THERRELL.
ART OF ELECTRICAL WAVE TRANSMISSION.
APPLICATION FILED FEB. 17, 1902.
4 SHEETS—SHEET 3.
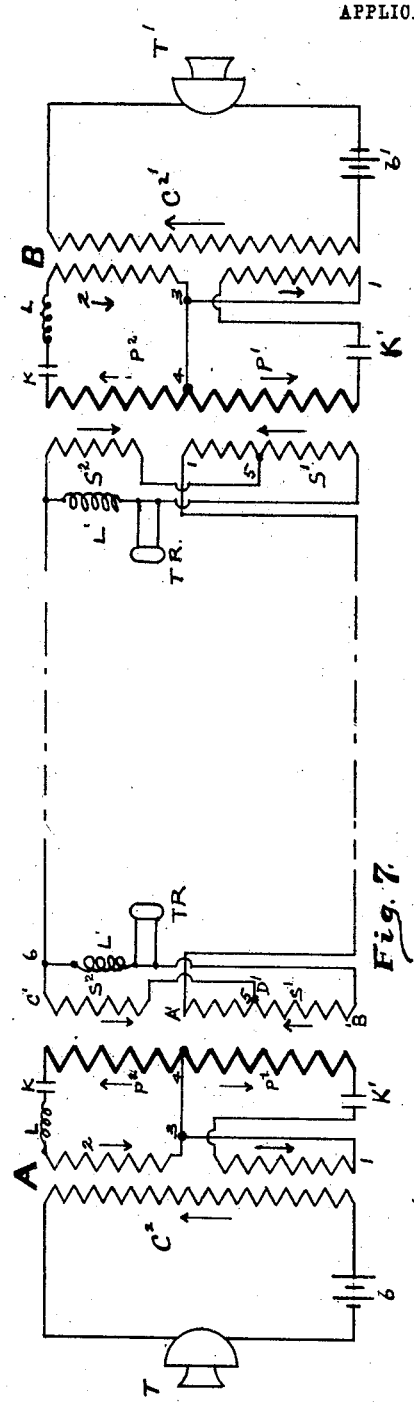
Fig. 7.
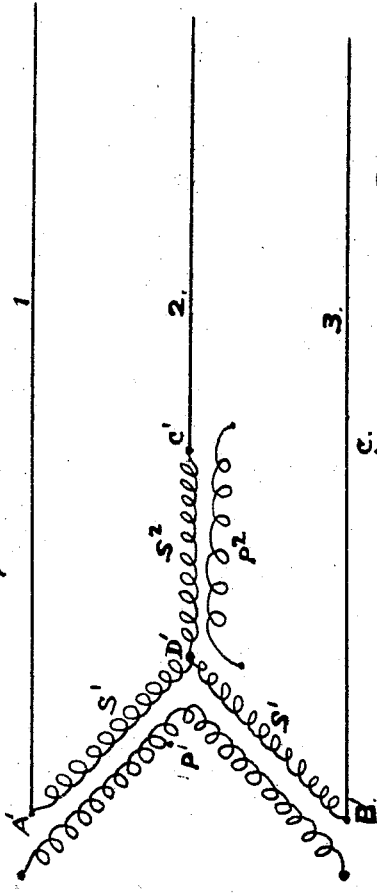
Fig. 8.
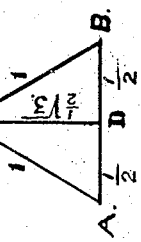
WITNESSES.
INVENTOR.

No. 779,508. PATENTED JAN. 10, 1905.
D. M. THERRELL.
ART OF ELECTRICAL WAVE TRANSMISSION.
APPLICATION FILED FEB. 17, 1902.

Witnesses
Franck L. Ourand
Wm W. Greble

Inventor
D Maclauchlin Therrell

No. 779,508.

Patented January 10, 1905.

UNITED STATES PATENT OFFICE.

DANIEL MACLAUCHLIN THERRELL, OF ATLANTA, GEORGIA.

ART OF ELECTRICAL WAVE TRANSMISSION.

SPECIFICATION forming part of Letters Patent No. 779,508, dated January 10, 1905.

Application filed February 17, 1902. Serial No. 94,499.

*To all whom it may concern:*

Be it known that I, DANIEL MACLAUCHLIN THERRELL, a citizen of the United States, residing at Atlanta, in the county of Fulton and State of Georgia, have invented new and useful Improvements in the Art of Electrical Wave Transmission, of which the following is a specification.

My present invention relates to the construction of electric speaking telephone systems, being a device or system for improving the transmission of speech through conductors or cables of great length which are characterized by high retardation effects operating to destroy the overtones, and thus the definition and articulate qualities of the transmitted speech.

As is well known, the sonorous waves or sounds constituting articulate speech involve various fundamental vibrations which are accompanied by numerous other vibrations ranging several octaves above their fundamental. The undulatory current created in the electrical transmission of such sounds must of course conform to the wave characteristics of the sound so transmitted, being a resultant wave of the fundamentals, together with the many accompanying over and lower tones differing in amplitude, phase, and periodicity. It is found in practice that the fundamentals and the lower harmonics are of comparatively easy transmission over an electrical circuit, while the higher or upper harmonics, upon which we are dependent for the qualities and definition of articulate speech, owing to their feeble values and the infinitesimal time through which these values are operative, are affected and distorted by the various conditions and reactions of the circuit to such an extent as to be degraded on long circuits to the level of their fundamentals, whereby articulation is lost and the transmitted speech rendered practically unintelligible. In the present invention I have endeavored to reinforce and preserve these overtones or partials, to the end that articulation and definition may be conserved and the character and form of the voice-waves maintained to the transmission limit of the fundamentals themselves.

In apparatus heretofore designed I have succeeded in securing more than ample volume or amplitude of energy to reach over all practical distances, but was unable to transmit the essential overtones along with their fundamentals sufficiently to render the articulation practicable and commercial.

My specific purpose has been to improve the art of telephony by producing an undulatory current modified to correspond to the undulations of speech in a well-known manner—as, for instance, by the use of a transmitter, battery, and primary coil—in a closed local transmitter-circuit and simultaneously with the generation thereof or subsequently thereto effect a modification of the character of the waves in such manner as shall render them better adapted for transmission or reproduction into sound, or both.

In order to place the claims appended hereto in their proper light and to afford a better understanding of the principles upon which my invention is founded, it is here deemed necessary to briefly state the general laws governing the propagation of sound-waves and their analogy to and equivalents in electrical undulations or waves transmitted over long wire conductors.

Whenever several sonorous bodies in the surrounding atmosphere simultaneously excite different systems of waves of sound, the changes of density of the air and the displacement and velocities of the particles thereof within the passages of the ear are each equal to the algebraical sum of the corresponding changes of density, displacements, and velocities which each system of waves would have separately produced if it had acted independently, and we may say in this sense that all the separate vibrations which the separate waves of sound would have produced coexist undisturbed at the same time within the passages of the ear. This generalization is true not only for the vibrations of sonorous bodies in the atmosphere, but in principle is equally applicable to all media wherein wave motion may be produced or transmitted, since all wave motions are reducible to and controlled by the same laws of motion in the ultimate particles of matter, the disturbance of the atomic or molecular arrangement of any given medium or body giving rise to a series of displacements, affecting all the particles within the sphere of propagation, and causing each particle after a certain lapse of time to pass through in a given plane all possible positions of value around its place of rest or equilibrium. Such disturbances are known as "wave motion" and are in principle the same for sound, heat, light, and electricity.

In dealing with the electrical transmission of sound-waves such as represent the sonorous vibrations of articulate speech it has been customary by many, as a result of our tendency to treat sound from a subjective point of view, to consider only the resultant form of the wave corresponding to any given sound and to treat such resultant wave as if wholly obeying the laws governing the transmission of simple alternating currents; but since every sonorous sound, with the exception of the simple tones of a tuning-fork, is a compound of many complex vibrations of varying value and phase relation it becomes apparent that such waves may not be so considered without doing violence to the constituent elementary waves whose algebraic sum determines the final or resultant wave form and which coexist upon the line independent and undisturbed from an objective point of view.

Let us consider now the component elements of the human voice and the essentials for transforming the sonorous vibrations into electrical vibrations and transmitting the same over long electrical circuits. Speech-tones are composed of some prime or fundamental tone and a series of partial tones ranging as high as the sixteenth or more above the prime. The definition of articulate speech is absolutely dependent upon the relative number and value of these partial tones and their ratio and phase relation to the prime or fundamental, articulation being good or bad in proportion to their dominance or subservience to the first or lower and louder tone. Now since these upper partial tones are in comparison with the fundamental both feeble and transient it follows that they are often so mixed up with and dominated by their fundamental as to essentially destroy the articulation of even sonorous speech, requiring resonators to detect their existence. This is especially applicable to such words as are characterized by consonant sounds, which are dependent for recognition upon feeble and aspirant noises of estopment or explosion accompanying the consonant letters. Such being the case, it has been found impossible to transform the sonorous vibrations of articulate speech into equivalent electrical vibrations without great sacrifice of articulation for even short circuits, only about thirty per cent. of the speech so transmitted being understood when severed from explanatory context or position. To improve this condition of affairs, much ingenuity and time have been expended upon both the telephonic apparatus and the line-conductor; but, so far as I am aware, no one has sought to improve or modify the component electrical waves in themselves so as to reinforce the upper partials by varying their relation to the fundamental and insuring unto them greater relative values, and hence both characteristic dominance over the prime and sufficient individuality to maintain their integrity to the limits of the energy impressed. This has been done by me with most satisfactory, not to say remarkable, results and forms the basis or principle of my invention. As the result of several years of research and experiment in this field I have discovered and verified the truth of the influence of phase relation upon the quality of sound. This may be stated as follows: The quality of a compound or complex tone or sonorous sound-wave depends upon the number and relative intensity of its partial simple tones and on the phase relations under which these partial tones enter into composition. This may or may not be said to settle the old controversy over this question, led upon the one side by the followers of the great Helmholtz and upon the other by the brilliant Dr. Koenig, Lord Rayleigh, and others; but the fact seems to remain that for electrical sound-waves at least my experiments coincide with and confirm the brilliant mechanical results obtained by Dr. Koenig with his wave-siren. This question has been one of warm dispute between eminent authorities for years and stood unsettled, with the preponderance of authority upon the side of Helmholtz, up to the time of my experiments with electrical waves of different phase relation and the positive results thereof, which form the basis of my present system of electrical wave transmission.

I am aware of the brilliant work of Lord Kelvin, Dr. Lodge, and Messrs. Heaviside and Hertz in the mathematical discussion of the laws governing the propagation of electrical waves over long circuits and am fully cognizant of the importance attached by many to self-inductance as a factor of such transmission, and yet while yielding all possible deference to such authorities I am constrained by experiments of a positive character to take issue with such conceptions to a considerable extent, finding, as I have, reasons for considering self-induction somewhat in the nature of a mechanical inertia instead of a wasteless store of energy, and that capacity has much less to do with the weeding out of the upper harmonics or partial tones than has heretofore been accredited.

While others have been working to improve the conducting medium so as to increase its conductivity for voice-currents, I have, on the contrary, arrived at the conclusion that the conducting medium as a limiting factor plays too small a part in the transmission of telephonic currents to warrant such elaborate and expensive treatment as has been proposed and instead have sought another solution. From my point of view the present status of conductors is such as to admit of little improvement, and the problem resolves itself into a question of transmitting the essential overtones or characteristic partials. This may be stated in other words as follows: The prime cause of the inability to transmit electrical sound-waves without deleterious attenuation lies in the human voice itself largely, whose characteristic partial tones and vocal noises are relatively so feeble in comparison with the fundamentals and lower partials as to be drowned out and lost, even in oral and sonorous sound-waves, unless particular stress and training is brought into service to conserve and reinforce them. This is amply illustrated by noting the difference in the articulate quality of the speech of children and uncultured persons as compared with the clear and distinct quality and enunciation in the case of a trained orator, vocalist, or elocutionist. In the former case the characteristic partial tones are very feeble and mixed up with the fundamentals or entirely dormant, while in the latter they are reinforced and controlled as the result of special culture and discrimination. (See Rayleigh, *Theory of Sound*, Vol. 2, page 445.) Consider now what would be the effect upon the resultant of an equivalent electrical voice or sound wave should we selectively reinforce such of the constituent partial tones as are essential to the transmission of the voice characteristics. Suppose that a given series of partial tones be reinforced either mechanically by properly-adjusted resonators corresponding to the given partials or electrically by a proper adjustment of the phase relation, so as to superpose or increase their values twice or thrice, in proportion to the fundamental and lower harmonics, or that such partial tones be superposed or reinforced, while the fundamental and lower tones are reduced. In such a case it is easily seen that since the intensity of sound increases as the square of the amplitudes such a relationship would render the partials so treated characteristically dominant over the fundamentals and lower tones, whose values have not been raised or have been reduced. This becomes all the more effective owing to the fact that vibrations of high pitch are more persistent and intense than low ones of the same value, so that for the production of tones of high pitch much less energy is required than for the lower ones, "and yet the higher tones appear to our sensation extraordinarily more powerful than the deep ones." (See Helmholtz, *Sensations of Tone*, page 774.) It is further seen that with such selective reinforcement of the essential partial tones the attenuation constants of a given circuit may be allowed for and still maintain an ample dominance of the essential characteristics over the lower tones, to the end that articulate quality may be conserved.

The method and apparatus whereby this theory has been worked out by me and is reduced to practice will be better understood by reference to the accompanying drawings, which are hereto attached and form a part of this specification, similar references being uniformly indicated by similar index-letters throughout the specification.

Figure 1 is a conventional diagram of a simple sinusoidal vibration or wave form. Fig. 2 is a diagram of two simple sinusoidal waves corresponding to a fundamental and its octave, as given by the vowel "O" as ordinarily spoken. Fig. 3 is a diagram of the resultant form or the algebraic sum of the two waves in Fig. 2. Fig. 4 is a series of the complex waves shown in Fig. 2 displaced one hundred and eighty degrees as regards the primes. Fig. 5 is a complex wave showing the prime and the first two partials, which corresponds to the vowel "E," as in "Eh," together with the resultant wave form. Fig. 6 shows a series of the complex waves shown in Fig. 5 displaced as regards the prime by one hundred and twenty degrees, together with a series of resultant wave forms thereof. Fig. 7 is a diagrammatic representation of the apparatus and circuits employed by me in my system in conventional symbols, which will be readily understood. Fig. 8 is a diagram and trigonometrical functions showing certain values and relations employed in Fig. 7. Figs. 9 and 10 are modifications thereof based upon one-hundred-and-eighty-degrees phase relation and will be easily interpreted. Fig. 11 is a conventional diagram showing how my system may be used to advantage in connection with a common battery system.

Referring to Figs. 1, 2, and 3, Fig. 1 is a graphical curve of the simple sinusoidal wave of an alternating current following the law of sines and which may be impressed upon a conductor and transmitted according to the well-known laws governing the flow of such currents. Fig. 2 shows a compound wave consisting of a fundamental and its first octave or partial. As explained above, these waves are separate and distinct in the physical or objective sense and act and react upon each other according to the principles of interference or the coexistence and superposition of small motions to form a resultant wave, which is expressed as the algebraic sum of the instantaneous values of the two component waves. The form of this resultant wave which characterizes the vowel "O" is shown in Fig. 3. Now an analysis of this resultant wave into its components, as shown in Fig. 2, makes it evident that such a wave in its resultant form cannot be considered as wholly obeying the laws governing the motions and flow of the simple wave shown in Fig. 1, and especially is this true when such a compound wave is acted upon by line reactions or modified by other waves, either simple or compound. For instance, the musical note given by such a wave as shown in Fig. 1 may be easily transformed into an equivalent electrical wave and transmitted without distortion of character to any distance within the limits of the energy impressed. Such, however, is not true for the wave shown in Fig. 3 and in a much less degree for more complex waves, for the sinusoid in Fig. 1 may suffer an attenuation of any percentage of its value by the absorption and reactions of the line conductor without affecting its character, such attenuation merely decreasing its amplitude, and hence its intensity, whereas a like attenuation of the wave shown in Fig. 3 becomes directly perceptible in its character, and if attenuated sufficiently the smaller wave becomes entirely wiped out, since the intensity thereof decreases as the square of its amplitude, and hence whatsoever of its value that may remain is lost in the dominant value of its fundamental. Therefore in treating the complex waves entering into the articulate speech it is imperative, if the best results are to be obtained, to consider not the wave in its resultant form, but rather the elementary waves that go to make up this resultant. Having proved this principle as applied to the transmission of telephonic currents, I have worked out a method and a type of the apparatus therefor whereby I am enabled to reinforce the necessary partials or overtones which constitute the essentials of articulation and definition and to do this in such a way as to greatly improve the character and intensity of the transmitted speech, as well as to increase the distance to which such transmission is possible. The operation of this system or method will be better understood by reference again to Figs. 2, 3, and 4.

Referring now to Fig. 2, which represents the vowel "O," suppose it is desired to transmit this wave over a circuit of great length without material distortion of its character. We know that it is an easy matter to so transmit the fundamental thereof; but unless some provision is made for maintaining the integrity of the partial the said partial is reduced by the attenuations of the line until it loses its modifying effect upon the fundamental and is merged therewith, and hence the original character of the sound is lost. This is particularly true of the more complex waves corresponding to the human speech; but if we increase the value of the partial twice or three times while maintaining the fundamental wave at approximately its original value or reducing it we shall have the resultant wave reinforced and dominated by its characteristic partial and able to withstand the line attenuation without loss of its character.

Referring now to Fig. 4, where we have three sets of complex waves $w'\ w''\ w'''$, each set being identical with the vowel "O," as shown in Fig. 2, let us consider the laws governing the values of such complex waves when superposed so as to act and react upon each other by interference. In this instance we have each set or train of waves displaced by one hundred and eighty degrees with regard to their fundamentals, or, in other words, each set of waves is assumed to lag behind the former by one hundred and eighty degrees. Now if these series of waves be impressed upon a medium in the order described there will take place a series of actions and reactions by which some of the waves in the constituent series will be destroyed or neutralized, while others will be increased as the sum of their original intensities. This is accomplished approximately by the type of apparatus shown in Fig. 10. Since it is a fact that the disturbance of any particle produced by the coexistence of two or more causes will be the algebraic sum of the disturbances which they would produce separately, let us consider the nature of the displacement produced by the superposition of the action of two waves of the same length on the same molecule at a distance $x$ from the wave-front. Upon this assumption we have for the first wave $$d' = \frac{a'}{x} \sin. \left[2\pi\frac{vt-x}{\lambda} + A'\right]$$

and for the second wave $$d'' = \frac{a''}{x} \sin. 2\pi\left[\frac{vt-x}{\lambda} + A''\right]\ldots$$

in which $d'$ and $d''$ equal the displacements, $a'$ and $a''$ determine the intensities of the sound in the two waves at the units distance, and $A'$ and $A''$ the places of maximum displacement or angular distance at the expiration of time $t$. Now if the component wave lengths $\lambda$ be equal and uniform and the arcs of displacement $A'-A''$ equal zero the maximum displacement $\frac{a}{x}$, which determines the intensity of the sound in the resultant wave, will be $$\frac{a}{x} = \frac{1}{x}\sqrt{a'^2 + a''^2 + 2\ a'\ a'' \cos. (A' - A'')}$$

(See Bartlett, *Acoustics and Optics*, pages 65 to 69) or, in other words, the waves being directly superposed and in phase will have their maximum value, which will equal the direct sum of the two waves, and since the intensity of sound is directly proportional to the square of the amplitude the intensity of sound in the resultant wave is quadruple that in either of the component waves. This also applies to the wave motions and values of electrical currents when the formula becomes the well-known electrical equation for the resultant of two waves of different value or phase relation $$r = \sqrt{a^2 + a'^2 + 2aa' \cos \Phi},$$

where $r$ is the resultant, $a$ and $a'$ the component waves, and $\Phi$ the phase angle, corresponding to $\frac{a}{x}$, $a'$ and $a''$, and $A' - A''$ in the acoustical formula. Now if $a'$ and $a''$ are equal and we make $A' - A''$ equal one hundred and eighty degrees then the equation gives $\frac{a}{x} = o$ and one wave completely neutralizes the other. Thus in Fig. 4 it will be seen that the fundamental wave $C'$ encounters an interference from the fundamental $C''$ of wave $w''$, which is of an opposite sign, and being equal in value and wave length, according to to the equation, $a'$ equals $a''$, and $A' - A''$ being equal to one hundred and eighty degrees the two waves mutually destroy each other. This is not the case, however, for the waves $c'$ and $c''$, representing the partials an octave above the primes, for where the primes or fundamentals are exactly one hundred and eighty degrees apart and of opposite sign, thus neutralizing each other, the partials are coincident and $$\frac{a}{x} = \frac{1}{x}\sqrt{a'^2 + a''^2 + 2a'a'' \cos (A' - A'')}$$

and the two waves are directly superposed, while the fundamentals are destroyed. Now wave $w'''$ is impressed upon the line in the same manner as $w'$ and $w''$, and the same actions and reactions as have been detailed for $w'$ and $w''$ are performed by this wave for each cycle or wave length. In this case, however, it will be readily seen that since the fundamental $C'$ and $C''$ of waves $w'$ and $w''$ are operating to neutralize each other the fundamental $C'''$ of wave $w'''$ is unopposed and impresses its full value upon the conductor, also that the partial $c'''$ of wave $w'''$ being in phase with partials $c'$ and $c''$ is directly superposed according to the formula, which results in the value of the resultant partial being raised to the sum of the values of the three component and corresponding partials, while the fundamentals are so placed in their phase relations that the first two cancel each other and only the third remains effective. From such a system of superposed component waves it will be seen that we get a resultant wave wherein the characteristic partial or partials has three times the relative amplitude of its prime, and hence modifies the prime with the essential sonorous characteristics for articulation. An inspection of these curves will show that the same principle applies for any number of partial tones, the evenly-numbered partials or harmonics being superposed at every instant, while the unevenly-numbered partials are partially neutralized or destroyed. This principle may be employed to neutralize the evenly-numbered as well as the unevenly-numbered partials of a complex wave whenever desired by so varying the phase relations of the superposed trains of waves as to satisfy the terms of the equation. From a special research of the matter I have discovered, however, that for speech-tones and the necessary characteristics thereof the best results are obtained by so arranging the phase relations as to superpose and reinforce relatively to the prime or fundamental the greatest practicable number of odd and even partials, which is obtained by separating the original current into three component parts and reassembling the said parts or components under phase relations of ninety degrees or one hundred and twenty degrees as regards fundamentals, as per Figs. 7 and 8, together in multiple and thence in series with $C'$, as shown.

Referring now to Figs. 5 and 6, where we have a series of curves of waves consisting of the fundamentals and the first two partials, together with several resultant wave forms, let us now consider the proposition of superposing the unevenly-numbered partials of a compound electrical wave corresponding to a sonorous sound-wave. The first unevenly-numbered partial is the third partial or the second harmonic, and by experiment I have discovered that this partial should be considered as a base. Therefore if we so arrange matters as to reinforce the third partial we shall at the same time reinforce every partial throughout the series which is a multiple thereof and to a less degree all others within the neighborhood of this reinforcement. Referring to Fig. 5, at $a$ we have the curves of a complex wave composed of the first three partials, and at $d$ a curve showing the resultant curve or wave form which is the algebraic sum of the series shown at $a$. In Fig. 6 we have a set of curves $a'$ $b'$ $c'$, identical with those shown at $a$ in Fig. 5, displaced relatively to each other by one hundred and twenty degrees or one-third of a harmonic cycle. From these curves it will be readily seen that for the series the algebraic sum is zero for all except the third partial, which is undisturbed. This is also the case for all multiples of this third partial. This resultant curve is shown at $d'$. Now if instead of impressing all three sets of these waves upon a conductor related as shown we impress only two sets and shunt most of the third train of the series—say $b'$ or $c'$—so as to maintain the integrity of the system, while only sending to the line the other sets, we shall have instead of the simple curve shown at $d'$ an entirely new complex series, as shown at $e'$, the resultant of which is shown at $f'$. Comparing $f'$ of Fig. 6 with $d$ of Fig. 5 the difference is at once seen to be one of a rather remarkable kind. The resultant fundamental has been shortened by sixty degrees, the third partial has become independent thereof, and the characteristic discontinuities are seen to be wonderfully more marked and abrupt than at $d$ in Fig. 5, where the wave is long and gradually sloping with ill-defined characteristics. This holds also for all multiples of the third partial present in the harmonic series. It may be generally laid down as a rule that the force or loudness of the upper partial tones is the greater the sharper the discontinuities of the resultant wave. When the wave alters uniformily and gradually, answering to the nature of a smooth vibrational curve, only the deeper partials and the prime have any perceptible intensity. (See Helmholtz, *Sensations of Tone*, page 35.) Therefore it is seen by these curves, where the third partial is reinforced relatively to the prime and second partial, that the answer to the theory is a positive one.

Before referring specifically to the drawings showing the system and apparatus whereby my theory is carried into practice let us consider fully the series of waves before referred to in Fig. 6. Again referring to Fig. 6 it will be noted that there are three separate series of complex waves displaced by a given angular distance. The voice or sonorous waves acting upon a telephonic transmitter in the well-known manner generate a corresponding series of electrical waves in the transmitter-circuit which are by induction impressed upon the line conductors. Now in order to obtain the condition of affairs upon the line conductor which is shown in Fig. 6 and required by theory this corresponding electrical complex wave must be divided into three separate series or its equivalent and again brought together and impressed upon the line conductors displaced from each other by one hundred and twenty degrees, or one-third of the harmonic cycle. To do this, special apparatus and circuits have been designed which will now be described by referring to Fig. 7. In this figure we have my system shown at A and B connected by the ordinary line conductors, which may be of any good conducting material. T and T' are the transmitters, $b$ and $b'$, $C^2$ and $C^{2'}$ are the batteries and transmitter primaries at A and B, respectively. As the apparatus at A and B are indentical, they may be considered and described under references at A and will be so treated in this specification. 1 and 2 are the secondaries of primary coil $C^2$ and operate through an inductance L and condensers K and K' into primaries P' and P$^2$, inductively related to secondaries S' and S$^2$, which are connected to line as shown. As this drawing may not be readily understood, as shown, let us consider first Fig. 8, where P' and P$^2$ are two primary coils of the transformers A' B' and C' D', inductively related to the secondaries S' and S$^2$, connected together at D' and to lines 1, 2, and 3. Now if the currents in the primaries P' and P$^2$ differ in phase by ninety degrees the same difference of phase will be impressed upon the electromotive forces generated in the secondaries of these coils. If we now consider the triangle A C B in the figure, wherein the length of each side is equal and let C D bisect the angle C, then C D is perpendicular to A B and bisects A B. Hence A D equals one-half, and C D equals $$\sqrt{1-\tfrac{1}{4}} = \sqrt{\tfrac{3}{4}} = \tfrac{1}{2}\sqrt{3}.$$

In the right triangle A D C the angle A C D equals thirty degrees and the angle C A D equals sixty degrees, whence sin. thirty degrees equals cos. sixty degrees, equals one-half cos. thirty degrees, equals sin. sixty degrees, equals $\tfrac{1}{2}\sqrt{3}$, tan. thirty degrees, equals cos. sixty degrees, equals $\dfrac{1}{\sqrt{3}}$. Therefore if the secondary S$^2$ corresponding to C' D' has $\dfrac{\sqrt{3}}{2}$ times as many turns as the secondary S' corresponding to A' B' then the electromotive force between the terminals C' and B' or C' and A' is the resultant of two components, one being the full electromotive force generated in the secondary of P$^2$ and the other half of the electromotive force generated in the secondary of P', the latter component being, moreover, displaced by ninety degrees as regards the former component, and the terminal pressures pass through zero at intervals of one hundred and twenty degrees and are thus impressed upon the lines. Now, if the terminals C' and A' of coils S' and S$^2$ be connected to a metallic circuit, while the other terminal B' be connected directly or through an inductance to C', we will have the counterpart of the line circuits and coils S' and S$^2$ of Fig. 7, whereby the currents are impressed upon the line as per the curves shown in Fig. 6 above described. It will be noted that the method of securing the diphase currents displaced by ninety degrees in P' and P$^2$ of Fig. 8, and therefore required in P' and P$^2$ of Fig. 7, has not been described. This is done as follows: Let a current be flowing through the primary of $C^2$. This generates an electromotive force in its secondaries 1 and 2, which form two closed circuits through the coils P' and P$^2$ and are connected together at 3 and 4. As will be noted, these closed circuits include an inductance L and capacities K and K'. Now since capacity and inductance or self-induction act in opposite directions upon a periodic electrict current as affecting its phase it is apparent that by adjusting these values with regard to each other and the resistance of the circuits we may vary the phase relations of these circuits by ninety degrees or more. The phase difference required by theory is one of ninety degrees, and since the power factor is to be considered even in these circuits it is preferable to so adjust these values as to make one circuit lag in phase by forty-five degrees, while the other leads by the same phase angle, thus balancing the power factor of the system and impressing upon the primaries P' and P² a current of ninety degrees difference of phase, which acts upon the secondaries S' and S², as described heretofore in reference to Fig. 8. In arranging this phase displacement certain circuit constants and functions must be observed, and hence it is deemed necessary to here give a mathematical solution of one case and one type of apparatus therefor in order that the rule may be clearly understood. From what has been said of the effects of resistance, capacity, and inductance in determining the phase of the current in a given circuit we may calculate for any given phase angle. The formula is $$\text{Tan. } \Phi = \frac{2 \pi n \text{L} - \dfrac{10^6}{2 \pi n \text{K}}}{\text{R}} \ldots$$

from which it will be seen that with three of the given terms, $n$, L K, and R, given we may transpose and find the required value of the other term for any predetermined value of $\Phi$, which represents the phase angle. To illustrate, suppose $\Phi$ be required equal to forty-five degrees of lag, then we have the equation:

$$\text{Tan. } \Phi = 1. = \frac{2 \pi n. \text{L} - \dfrac{10^6}{2 \pi n \text{K}}}{\text{R}} \ldots$$

where $n$ equals frequency of the impressed electromotive force; L equals the inductance in henries; K equals the capacity in microfarads; R equals the resistance of the circuit in ohms. Given the frequency $n$ as two hundred and fifty p. p. s., the inductance L as .021 henry, and the resistance as 1.1 ohm and it is required to find the value of K, where the current is required to lag forty-five degrees, or the inductance or positive component is to dominate, then forty-five degrees equals $\Phi$, tan. $\Phi$ equals 1, and $$\frac{10^6}{\dfrac{2 \pi n \text{L} - \text{R}}{2 \pi n}}$$

equals K, equals 19.96 microfarads. Now for the same given constants where the current is required to lead by forty-five degrees, or the capacity effect is to dominate, the formula becomes $\Phi = -45$ degrees, Tan. $\Phi = -1$, and $$\frac{10^6}{\dfrac{2 \pi n \text{L} + \text{R}}{2 \pi n}}$$

equals K equals 18.67 microfarads. In this connection it will be observed that when the expression $$2 \pi n \text{L} - \frac{10^6}{2 \pi n \text{K}}$$

is positive—that is, where L is of greater effect than K—the current lags, whereas when it becomes negative—that is, where K is greater in effect than L—the current leads the electromotive force. Since it is equally necessary to know the values of L, the formula is here given, which is $$\text{L} = \frac{4 \pi t^2 \text{A} \mu}{2 \, 10^9}$$

where $t$ equals number of turns, A equals area of core in square centimeter cross-section, 1 equals mean length of the magnetic circuit, $u$ equals permeability which may be taken as one hundred and eighty for iron cores usually used. Now since it is required to maintain as much current as possible in the primaries P' and P² of coils A' and B' it becomes necessary to keep the resistances of the secondaries of C² and the primaries P' and P² as low as is practicable. In the case under consideration the secondaries 1 and 2 of primary C² contained each four hundred and eighty turns of No. 17 wire and measured .6 ohm, while the primaries P' and P² contained three hundred and seventy-seven turns of No. 18 wire and measured .5 ohm, making the total resistance of the circuit 1.1 ohm. For this low resistance it was not necessary to insert the inductance-coil L, since the self-induction of the coil P² itself amounted to twenty-one millihenrys. This involves larger values for K than will be necessary when R and L are increased and also shows that L, R, and K may be varied within wide limits without materially affecting the results. It should be mentioned in this connection, however, that since the two secondaries of coil C² are practically on short-circuit, thus neutralizing the self-induction of their primary, a very large current will flow therein, giving rise to hysteresis and eddy-current losses proportional to the frequency $n$ and the square of the frequency, respectively. It is therefore necessary to design the magnetic circuit of coil C² so as to work at the lowest magnetic density compatible with efficiency.

Now let us consider the question of frequency $n$. It has been seen that theory calls for the reinforcement or boosting of the upper partials or the multiples of the third partial. It is claimed by many telephonic authorities that the highest essential frequency of telephonic transmission falls near seven hundred and fifty p. p. s.; but since there have been discovered in the human voice as many as sixteen partial tones it seems that much might be gained by considering frequencies much higher than this as speech characteristics. Therefore in calculating for angles of lag and lead a frequency of $n$ equals two hundred and fifty p. p. s. has been assumed as a base, this frequency coming near the average voice fundamental. The third of this base is seven hundred and fifty p. p. s., and from our theory all necessary frequencies are cared for above this throughout the harmonic series. An apt illustration is here afforded of the effect or power of the so-called "watless" watts. Calculating upon a frequency of two hundred and fifty p. p. s. as above, it will be seen that in both primary circuits P' and P² current frequencies below two hundred p. p. s. will lead by nearly a right angle, and yet this apparently has no effect upon the transmission of waves as low as one hundred p. p. s.

Figs. 9 and 10 show an approximate form of my system based upon a phase relation of one hundred and eighty degrees, being the form first used by me in testing the theory as first blocked out, and will be readily understood from what has already been disclosed.

Figure 11:
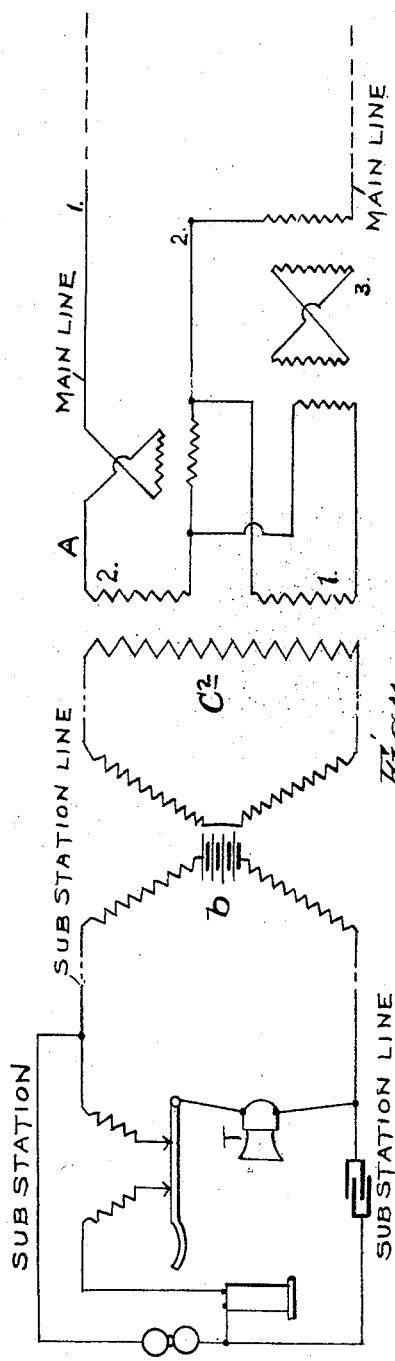
Fig. 11 shows the adaptation of my system to the ordinary type of common battery systems.
Figure 9:
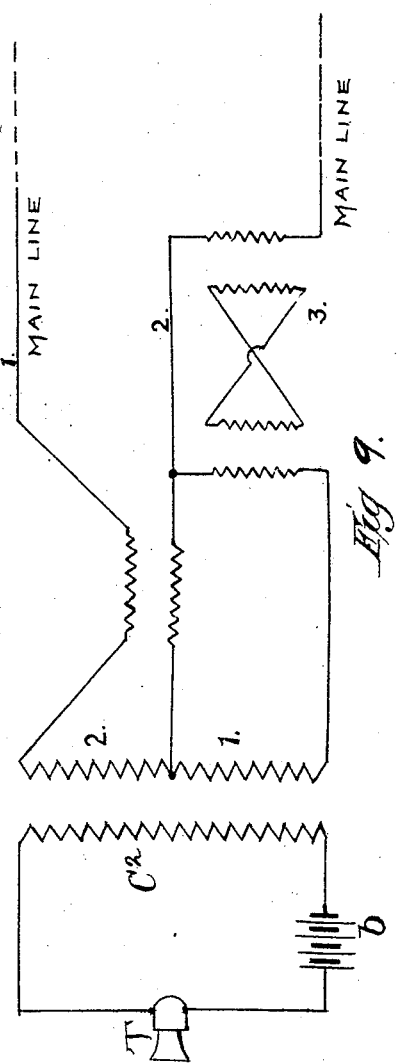

From what has been given in the foregoing exposition of my theory and apparatus, together with the diagrams explaining the various steps thereof, it is believed that the operation of the system will be readily followed by those skilled in the art.

It is of course apparent that many changes or modifications can be made herein without departing from the spirit or principle of my invention. For instance, a series of resonators or tuning-forks corresponding to certain partials might be mounted radially around the diaphragm of a telephonic transmitter in such a manner as to respond to some of the partials of the voice mechanically and by reaction upon the diaphragm reinforce the sound-waves so transmitted. It is not believed, however, that the best results may be obtained from such an application.

Another advantage of my system is the possibility therein afforded of transmitting to line a large voice-current without the pernicious side tone so well known to telephone engineers. Reference to Fig. 7 will show that instead of placing the telephone-receiver in the main line, as usual, the same is placed in the shunt-circuit between B' and C' or B' and D' in such way as to receive but a small portion of current sent to line, whereas it becomes more sensitive than the usual arrangement for currents received from B. Ordinarily the self-induction of the receiver itself, which averages about seventy-five millihenries, may be used in lieu of the inductance shown in series therewith in Fig. 7.

The apparatus is not claimed herein.

Now, having described my invention and without limiting myself to the precise details shown, what I claim as new, and desire to secure by Letters Patent of the United States, is—

1. In the art of the electrical transmission of sound, the method of improving the reproduction thereof, which consists in increasing the essential characteristic partial tone or tones of the said sound substantially as set forth.

2. In the art of the electrical transmission of sound, the method of increasing the efficiency of reproduction which consists in increasing the essential characteristic partial tone or tones of the said sound substantially as set forth.

3. In the art of the electrical or telephonic reproduction of sound, the method of increasing the efficiency of transmission which consists in relatively increasing the value of the essential characteristic partial tone or tones, substantially as set forth.

4. In the art of the electrical transmission of sound-waves, the method of decreasing the attenuation, which consists in increasing the value of such waves as correspond to the essential characteristic partial tones of the said sound-waves, substantially as set forth.

5. In the art of the electrical transmission of sound-waves, the method of reducing the attenuation which consists in relatively increasing the value of such waves as correspond to the characteristic partial tone, or tones of the said sound-waves, substantially as set forth.

6. In the art of the electrical transmission of sound, or voice waves, the method of decreasing the attenuation of the characteristic overtones, which consists in increasing the differential values of such waves as correspond to the said characteristic overtones, while reducing the differential values of such waves as correspond to the fundamental and lower partial tones, substantially as set forth.

7. In the art of electrical reproduction of sound, the method of improving the definition or articulation which consists in relatively increasing the essential characteristic partial tone or tones of the said sound, substantially as set forth.

8. In the art of electrical reproduction of sound, the method of improving the definition or articulate quality thereof, which consists in relatively reducing the prime, and lower partial tones of said sound substantially as set forth.

9. In the art of electrical reproduction of sound, the method of improving the definition or articulation thereof, which consists in relatively increasing such component or components of a compound wave as correspond to the essential characteristic partial tones of the said sound, substantially as set forth.

10. In the art of electrical reproduction of sound the method of improving the definition or articulation thereof, which consists in relatively reducing such component or components of a compound wave as correspond to the prime and lower partial tones of the said sound, substantially as set forth.

11. In the art of electrical reproduction of sound, the method of improving the definition or articulation thereof, which consists in increasing the essential characteristic partial tones of the said sound, substantially as set forth.

12. In the art of electrical reproduction of sound, the method of improving the definition or articulation thereof, which consists in reducing the prime or fundamental of the said sound, substantially as set forth.

13. In the art of electrical reproduction of sound the method of improving the definition or articulation thereof which consists in relatively increasing the effective value of such component, or components of a compound electrical wave as correspond to the essential characteristic partial tones of the said sound, substantially as set forth.

14. In the art of the electrical reproduction of sound, the method of improving the definition or articulation thereof which consists in relatively reducing such component or components of a compound electrical wave as correspond to the prime and lower partial tones of the said sound, substantially as set forth.

15. In the art of telephonic reproduction of sound, the method of improving the transmission and definition thereof which consists in so adjusting the phase relations of a series of complex waves as to produce by interference an increase in the resultant value of the components thereof corresponding to the characteristic partials, or overtones of the said sound, substantially as set forth.

16. The step in the art of electrical communication which consists of increasing such component parts of a compound electrical wave as correspond to the essential characteristic overtones of the sonorous sound-waves, or voice-waves, while maintaining such parts as correspond to the prime and lower partial tones of the said sound-waves, or voice-waves at such value as to insure the characteristic dominance of the aforesaid component parts corresponding to the characteristic overtones, substantially as set forth.

17. In a telephonic system the method of increasing the essential voice characteristics, and thereby improving the definition and transmission of electrically-transmitted speech which consists of impressing upon a conducting medium a series of voice-waves and of so arranging the phase relations of the said series as to make them operate to reduce the fundamental and lower partial tones while increasing the upper partials, or overtones of the said voice-waves, substantially as set forth.

18. In a telephonic system the method of increasing the essential voice characteristics and thereby improving the transmission and definition of electrically-transmitted speech, which consists of impressing upon a conducting medium, a series of electrical voice-waves or sound-waves, and of so arranging the phase relations of the said series as to make them operate by interference to reduce the fundamental and lower partial tones while increasing the upper partials, or overtones of the said voice or sound waves, substantially as set forth.

19. The step in the art of electrical communication, which consists in increasing the value of such component electrical currents of a compound electrical wave, as correspond to the essential characteristic partial tones of the sonorous sound-wave, or voice-wave to be electrically transmitted, so that the said component electrical currents, corresponding to the essential characteristic partial tones, of the said sonorous sound-wave, or voice-wave, may be rendered relatively superior to and characteristically dominant over the prime or fundamental of the aforesaid compound electrical wave, substantially as set forth.

20. The step in the art of electrical communication, which consists in increasing the value of such component electrical currents of a compound electrical wave, as correspond to the essential characteristic partial tones of the sonorous sound-wave, or voice-wave to be electrically transmitted so that the said component electrical currents, corresponding to the essential characteristic partial tones of the said sonorous sound-wave, or voice-wave, may be rendered relatively superior to and characteristically dominant over the prime or fundamental of the aforesaid compound electrical wave, and of transmitting such compound electrical wave over an electrical circuit and converting the same into sonorous sound-waves, substantially as set forth.

21. The step in the art of electrical communication, which consists in impressing upon a line conductor, a series of compound electromagnetic waves corresponding to sonorous sound-waves, and of increasing the value of such component parts thereof as correspond to the essential characteristic partial tones of the said sonorous sound-waves, so that the said component parts of the said compound electromagnetic wave corresponding to the essential characteristics of the sonorous sound-waves to be electrically transmitted, may be rendered relatively superior to and determinately dominant over the prime or fundamental of the aforesaid compound electromagnetic wave, and of converting the said compound electromagnetic wave again into sonorous sound-waves, substantially as set forth.

22. The step in the art of telephonic communication which consists in increasing the value of such component parts of a compound electrical current-wave, as correspond to the essential differential characteristic partial tones of the sonorous sound-wave, or voice-wave, to be electrically transmitted, so that the said component parts corresponding to the essential characteristic partial tones of the said sonorous sound-wave, or voice-wave, may be rendered relatively superior to, and determinately dominant over the prime and lower partials of the aforesaid compound electrical current-wave and of transmitting the said compound electrical current-wave over an electrical conductor and converting the same into sonorous sound-waves, substantially as set forth.

23. The step in the art of telephonic communication, which consists in impressing upon a line conductor, a series of compound electrical current-waves, corresponding to sonorous sound-waves, and of increasing the value of such component parts thereof as correspond to the essential characteristic partial tones of the said sonorous sound-waves, so that the said component parts of the said compound electrical current-wave, corresponding to the essential characteristics of the sonorous sound-waves to be electrically transmitted, may be rendered relatively superior to, and determinately dominant over the prime and lower partials of the aforesaid compound electrical current-wave, and of converting the said compound electrical current-wave again into sonorous sound-waves, substantially as set forth.

24. In a telephonic system the method of reinforcing the essential voice characteristics, and thereby improving the transmission and articulation of electrically-transmitted speech, which consists in impressing upon the line a successive series of voice-waves of the same essential form, and of so arranging the phase relations of the said series of successive voice-waves as to make them operate by interference to reduce the fundamental while increasing the partials of the said voice-waves corresponding to the essential characteristic partial tones of the sonorous voice-waves electrically transmitted, substantially as set forth.

25. In a telephonic system the method of reinforcing the essential partial waves of a compound electrical voice-wave corresponding to the essential characteristic overtones of the sonorous sound-wave, or voice-wave, to be electrically transmitted, which consists in impressing upon the conducting medium a successive series of compound electrical voice-waves, and of so arranging their phase relations as to cause them to operate by interference and superposition to reduce the fundamental of the aforesaid compound electrical voice-wave, while increasing the essential characteristic overtones thereof and thereby improving the transmission efficiency and articulation of the resultant electrical voice-wave so transmitted, and of converting the said resultant electrical voice-wave into sonorous sound-waves, substantially as set forth.

26. The method of transmitting sound telegraphically by causing electrical undulations similar in form to the vibrations of the air accompanying the said sound, and also repetitions of each of said electrical undulations, substantially as set forth.

27. The method of reproducing sound telegraphically which consists in impressing upon a conducting medium a plurality of sets of overlapping electrical undulations corresponding in periodicity to the vibrations of the air accompanying the said sound, and converting said overlapping sets of undulations into vibrations of air, substantially as set forth.

Atlanta, Georgia, January 4, 1902.

D. MACLAUCHLIN THERRELL.

Witnesses:
JOHN KNOWLES HARPER,
LUCIUS A. LINDSEY.